United States Patent [19]

Dirkin et al.

[11] Patent Number: 4,685,384

[45] Date of Patent: Aug. 11, 1987

[54] FLUID ACTUATOR INCLUDING COMPOSITE CYLINDER ASSEMBLY

[75] Inventors: William Dirkin, Portage; Duane Douglass, Vicksburg; James N. Tootle; Terry L. Benton, both of Portage, all of Mich.

[73] Assignee: Pneumo Corporation, Boston, Mass.

[21] Appl. No.: 834,501

[22] Filed: Feb. 28, 1986

Related U.S. Application Data

[63] Continuation of Ser. No. 642,540, Aug. 20, 1984, abandoned.

[51] Int. Cl.$^4$ .............................................. F16S 10/02
[52] U.S. Cl. ........................................ 92/166; 92/169
[58] Field of Search ..................... 92/166, 169.1, 170, 92/171; 123/193 C

[56] References Cited

U.S. PATENT DOCUMENTS

| | | | |
|---|---|---|---|
| 1,598,138 | 8/1926 | Jacobsen | 92/166 |
| 2,168,131 | 8/1939 | Maler | 92/171 |
| 4,189,985 | 2/1980 | Harris | 92/170 |

FOREIGN PATENT DOCUMENTS 199147  6/1923  United Kingdom ............ 92/169 R

*Primary Examiner*—Abraham Hershkovitz
*Attorney, Agent, or Firm*—Renner, Otto, Boisselle & Lyon

[57] ABSTRACT

Fluid actuator includes a composite cylinder having circumferential hoop stress windings wrapped about a liner member forming the piston chamber wall, and longitudinal tension windings extending from the outboard end of the cylinder along one side thereof and around the inboard end of the cylinder to the other side and back to the outboard end where they are secured to the cylinder. A compression column of composite material may be provided between a cylinder end wall and a permanent structure mount at the inboard end of the cylinder to extend the length of the cylinder to accommodate a tail stock on the piston of a pressure balanced actuator.

33 Claims, 5 Drawing Figures

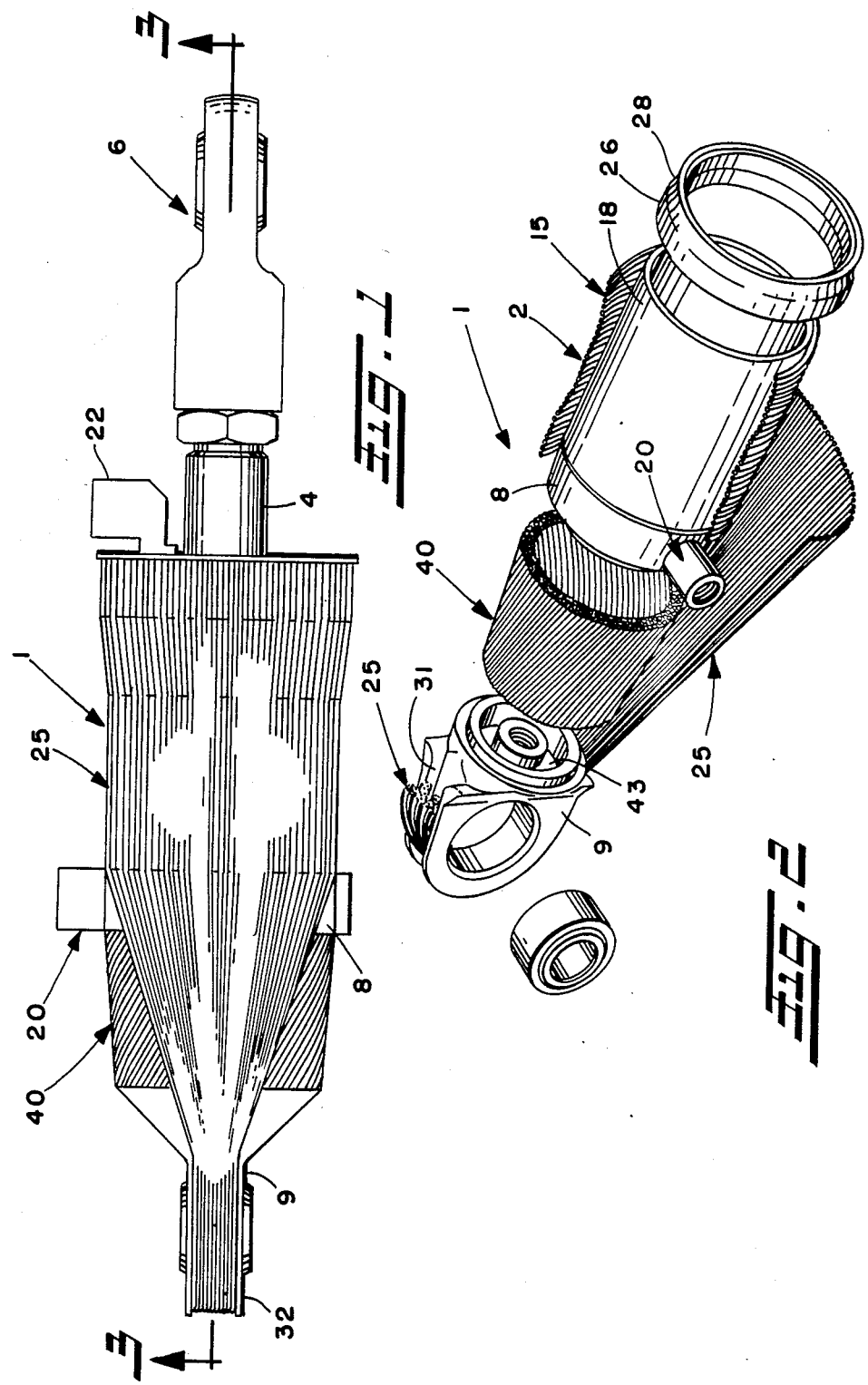

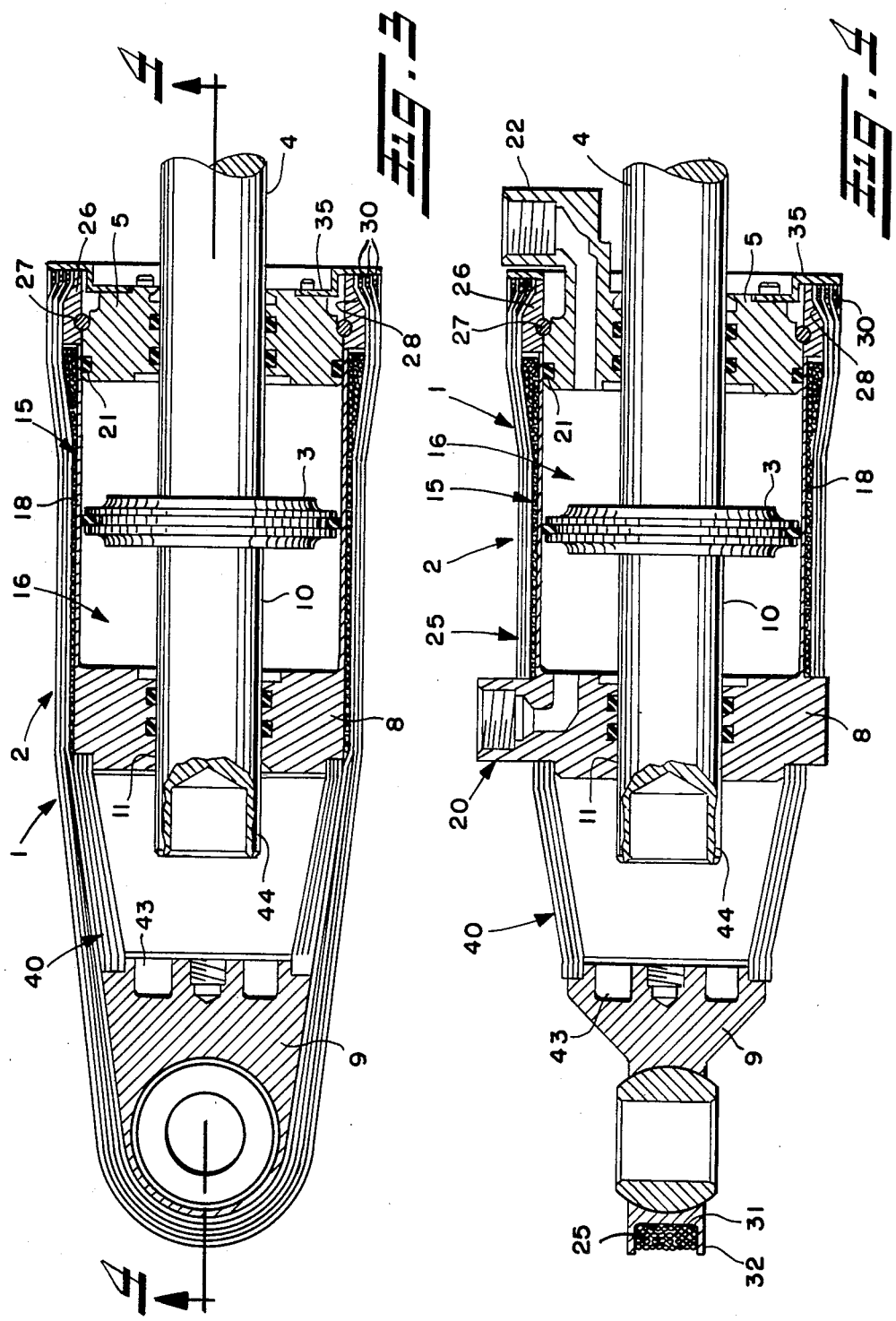

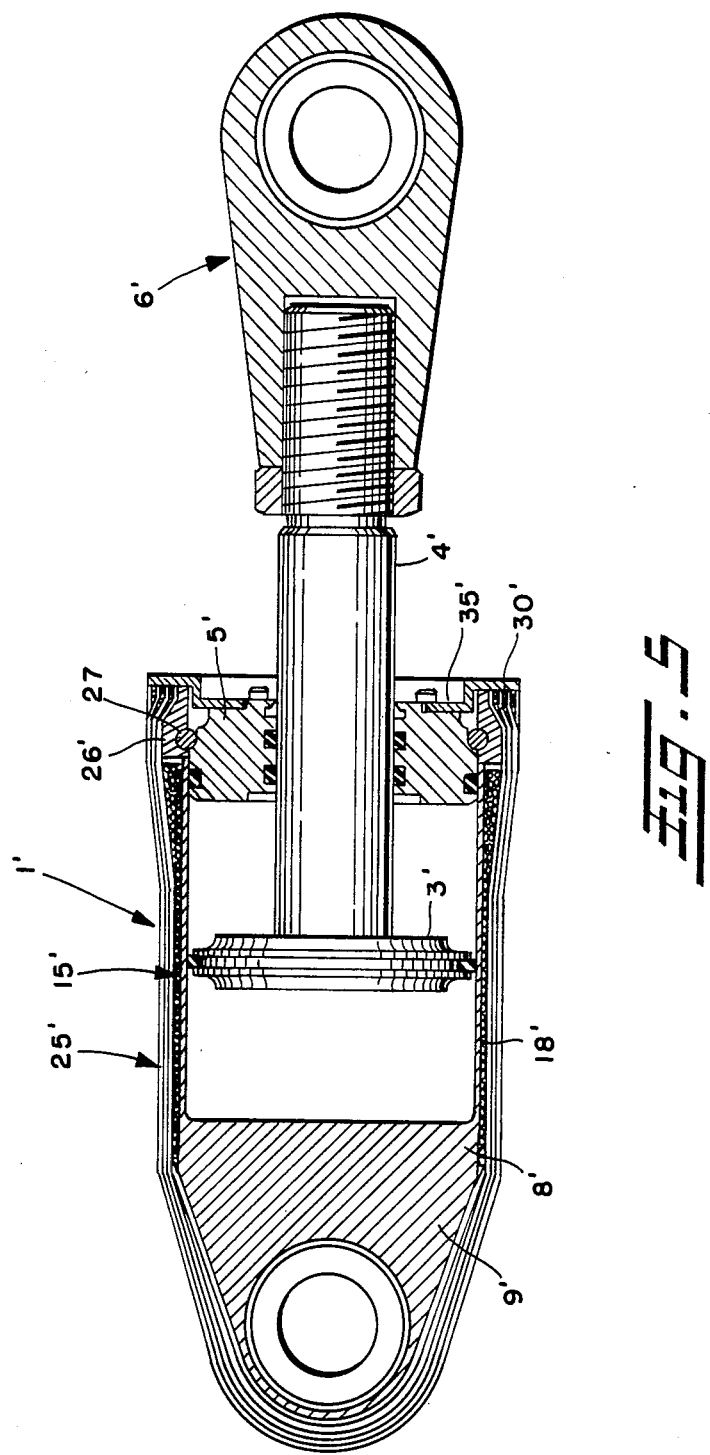

FLUID ACTUATOR INCLUDING COMPOSITE CYLINDER ASSEMBLY

This application is a continuation of application Ser. No. 642,540, filed 8-20-84, now abandoned.

BACKGROUND OF THE INVENTION

This invention relates generally, as indicated, to a fluid actuator including a composite cylinder assembly which permits a substantial reduction in the weight of the actuator without sacrificing strength.

Fluid actuators of the type used in flight controls for aircraft and other high pressure applications must be able to withstand high impulse pressures without failing over extended periods of time. Heretofore, in order to ensure that the actuator had the necessary strength and because of manufacturing considerations, the usual practice was to make the actuator cylinder out of a monolithic metal piece, which not only added considerably to the weight of the actuator in the highly stressed areas, but also in the relatively unstressed areas as well.

SUMMARY OF THE INVENTION

In accordance with one aspect of the invention, the fluid actuator includes a cylinder made of relatively high strength to weight composites in the highly stressed areas and relatively light weight metals in the relatively unstressed areas.

In accordance with another aspect of the invention, circumferential or hoop stress windings are provided around the radially pressurized areas of the actuator cylinder to carry hoop loads and prevent diametrical expansion of the cylinder, and longitudinal tension windings extend over substantially the entire length of the actuator cylinder from the outboard end to the permanent structure mount at the inboard end so that any tension loads developed within the actuator are reacted directly back to the support structure through the longitudinal tension windings.

Further in accordance with the invention, a compression column of composite material may be provided between the permanent structure mount at the inboard end of the cylinder and the adjacent cylinder end wall to extend the length of the cylinder in cases where such additional length is needed to accommodate a tail stock on the piston of a pressure balanced actuator.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a side elevation view of a preferred form of fluid actuator in accordance with this invention;

FIG. 2 is an exploded isométric view showing the various component parts of the actuator cylinder;

FIG. 3 is a longitudinal section through the actuator of FIG. 1, taken on the plane of the line 3—3 thereof;

FIG. 4 is a longitudinal section through the actuator of FIG. 3, taken on the plane of the line 4—4 thereof; and FIG. 5 is a fragmentary longitudinal section through another form of actuator in accordance with this invention.

DETAILED DESCRIPTION OF THE PREFERRED EMBODIMENTS

Referring now in detail the drawings, and initially to FIGS. 1-4 thereof, there is shown a preferred form of fluid actuator 1 in accordance with this invention which generally comprises a cylinder 2 containing a piston 3 having a rod 4 extending therefrom through an end wall or gland 5 at the outboard end of the cylinder. At the outermost end of the rod is a rod end assembly 6 to facilitate connection to a movable part to be actuated. At the inboard end of the cylinder 2 is another end wall member or bulkhead 8 from which extends a suitable mount such as a bearing retainer 9 for attachment to the stationary part of the device to be actuated.

Suitable seals may be provided between the end gland 5 and piston rod 4 to prevent leakage of fluid therebetween. Where the actuator is pressure balanced by means of a tail stock 10 having the same outer diameter as the piston rod extending from the side of the piston opposite the piston rod, a central opening 11 is provided in the bulkhead 8 for receipt of the tail stock, with suitable seals therebetween as shown in FIGS. 3 and 4.

In accordance with one aspect of this invention, the cylinder 2, rather than being made of the usual monolithic steel construction, is of a composite construction including circumferential or hoop stress windings 15 surrounding the piston chamber 16 over the entire length thereof as shown in FIGS. 2-4. The hoop stress windings 15 are desirably made of a suitable composite fiber such as a high modulus graphite filament wound fiber which has a relatively high tensile strength to weight ratio to carry the hoop loads and prevent diametrical expansion of the cylinder when high pressure fluid is admitted to either end of the chamber 16 during extension and retraction of the piston. The fibers are impregnated with a suitable resin such as epoxy, polyester, polyimide, etc. Such hoop stress windings preferably surround a sealing, wear resistant liner member 18 which defines the inner wall of the piston chamber. The liner member 18 is preferably a relatively thin liner member and is preferably made of a relatively light weight metal such as aluminum that not only acts as a barrier to the hydraulic fluid, but also provides a suitable surface for hardcoat which forms an extremely hard wear resistant surface that will withstand the sliding contact at the piston head diameter. Of course, the liner member may also be made from other materials such as wear resistant plastics or stainless steel if desired. Moreover, in certain applications the liner member could be eliminated altogether. The purpose of the hoop stress windings, which not only surround the cylinder liner but also the adjacent ends of the end gland 5 and bulkhead 8, is to keep diametrical expansion of the cylinder to a minimum and protect the cylinder liner from fatigue effects.

The bearing retainer 9 as well as the bulkhead 8 and end gland 5 are also desirably made of a relatively light weight metal such as aluminum. Moreover, the extend pressure port 20 preferably extends through the bulkhead 8, and the cylinder liner 18 is sealed to the bulkhead.

The end gland 5, which is at the opposite end of the liner from the bulkhead 8, is formed separately, with the free end of the liner and hoop stress windings surrounding same extending over a portion of the exterior length of the end gland, and a suitable seal 21 between the end gland and liner to prevent fluid leakage therepast. The actuator retract port 22 desirably extends from the outer end wall of the end gland.

When fluid pressure is admitted to the retract side of the piston through the retract port 22, a reaction force is generated in the end gland 5 which is transferred to the bearing retainer 9 at the inboard end of the actuator by longitudinal tension windings 25 which loop around the bearing retainer 9 and extend substantially the entire length of the cylinder from one side of the end gland to the other. These longitudinal tension windings are also desirably made of suitable composite fibers having the required high tensile strength such as high modulus graphite filament wound epoxy impregnated fibers which may be protected from handling damage by a thin layer of fiberglass reinforced composite.

The opposite ends of the longitudinal tension windings 25 are shown secured to the end gland 5 by means of a ring retainer 26 connected to the end gland adjacent the axial outer end of the hoop stress windings 15 in any suitable manner, for example, by a threaded connection or by means of a retainer wire 27 as shown. The annular ring 26 extends radially outwardly beyond the adjacent end of the liner 18 and has a circumferential groove or taper 28 in the radial outer surface thereof.

The taper 28 faces in the direction opposite the head end 9 and is engaged by the ends of the longitudinal tension windings 25 which are affixed thereto through the use of circumferential windings 30 wrapped about the longitudinal tension windings radially outwardly of the groove or taper 28. When there is more than one layer of longitudinal tension windings 25 as shown, circumferential windings 30 are preferably interspersed between each layer of longitudinal tension windings for added strength.

As best seen in FIGS. 1 and 2, the wrap angle of the longitudinal tension windings 25 changes over the length of the cylinder. That is, in the region of the bearing retainer 9, the longitudinal tension windings are bunched together in a plurality of substantially parallel layers as they extend around the bearing retainer within the groove 31 defined by the external flanges 32 thereon. From there the longitudinal tension windings span out from opposite sides of the actuator at an angle toward the ring retainer 26 until one or more layers substantially completely cover the circumference thereof.

The hoop stress windings 15 are desirably multi-layered adjacent the ring retainer 26 to eliminate any voids between the hoop stress windings and longitudinal tension windings 25 where the longitudinal tension windings extend over the ring retainer. The extend pressure port 20 which extends radially outwardly from the bulkhead 8 is located in an area which is not covered by the tension winding overwrap 25, whereas the retract pressure port 22 desirably extends axially outwardly beyond the outer end of the ring retainer 26 so as not to interfere with such overwrap. Also, an end plate 35 may be attached to the outer end of the end gland 5 with the outer periphery of the end plate overlapping the axial outer end of the ring retainer 26 to prevent the end gland from being pulled into the chamber 16 during retraction of the actuator. The final assembly is placed in an oven and heated to a temperature sufficient to cause the windings 15, 25 to bond to each other.

From the foregoing, it will be apparent that the reaction force which occurs in the end gland 5 as when retract pressure is supplied to the retract side of the piston will be transferred from the end gland first to the ring retainer 26 and then to the longitudinal tension windings 25 which generates a tension load in the longitudinal tension windings that is reacted through these windings back to the bearing retainer 9 and thus to the support structure to which the bearing retainer is connected. When extend pressure is supplied to the extend side of the piston through the extend port 20, a reaction force is generated in the bulkhead 8 which is transferred directly back to the bearing retainer 9.

In the balanced actuator design shown in FIG. 1-4, a compression column 40 made of suitable composite fibers such as graphite epoxy impregnated fibers is desirably interposed between the bulkhead 8 and bearing retainer 9 to provide a relatively light weight extension at the inboard end of the cylinder for receipt of the tail stock 10. The compression column 40 is wound separately from low angle helical fibers and inserted between the bulkhead 8 and bearing retainer 9 prior to wrapping the longitudinal tension windings 25 around the assembly.

An annular groove 43 may be provided in the inner end of the bearing retainer 9 for receipt of a hollow end 44 of the tail stock 10 when the piston 3 is fully retracted, which not only reduces the weight of the bearing retainer, but also permits a slight reduction in the overall length of the cylinder.

When there is no need for the fluid actuator to be balanced, the tail stock 10 may be eliminated along witht he opening 11 in the bulkhead for the tail stock. Also, the compression column 40 may be eliminated, and the bearing retainer 9' may be made integral with the bulkhead 8' as shown in FIG. 5 thus substantially reducing the overall length of the actuator 1'. Of course, in that event the length of the longitudinal tension windings 25' will have to be correspondingly shortened. Otherwise, the details of construction and operation of the actuator 1' shown in FIG. 5 are substantially the same as that shown in FIGS. 1-4, and accordingly the same reference numerals followed by a prime symbol are used to designate like parts.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

The embodiments of the invention in which an exclusive property or privilege is claimed are defined as follows:

1. In a fluid actuator, a cylinder including a chamber for receiving a piston-rod assembly, said chamber having end wall members at opposite ends thereof and a liner member defining the inner wall of said chamber, said liner member having one end in overlapping engagement with one of said end wall members, said one end wall member having a ring portion extending radially outwardly beyond said one end in said liner member, circumferential hoop stress windings extending circumferentially around said liner member over the entire length thereof, said hoop stress windings extending substantially the full radial extent of said ring portion outwardly of said one end of said liner member, and longitudinal tension windings extending over said circumferential hoop stress windings.

2. The actuator of claim 1 further comprising securing means for securing said longitudinal tension windings to said ring portion of said one end wall member.

3. The actuator of claim 2 wherein said securing means includes a circumferential groove in the radial outer surface of said ring portion which receives a portion of said longitudinal tension windings, and circumferential windings wrapped about said longitudinal tension windings for securing said longitudinal tension windings in said circumferential groove.

4. The actuator of claim 1 wherein said longitudinal tension windings extend around the end of said cylinder opposite said one end wall member from one side to the other, and securing means are provided for securing the opposite ends of said longitudinal tension windings to said ring portion.

5. The actuator of claim 4 wherein said cylinder includes a support structure mount at said end, said longitudinal tension windings extending around said support structure mount intermediate the ends of said longitudinal tension windings.

6. The actuator of claim 5 wherein said longitudinal tension windings are substantially parallel to each other in the region of said support structure mount and then fan out from opposite sides of said cylinder at an angle toward the other end of said cylinder.

7. The actuator of claim 6 wherein said longitudinal tension windings substantially completely covr said other end of said cylinder.

8. The actuator of claim 4 further comprising a compression column between said support structure mount and the other end wall member which provides an extension at the inboard end of said cylinder, said chamber containing a piston having a rod extending from one side of said piston through said one end wall member, and a tail stock extending from the opposite side of said piston through said other end wall member into the extension of said cylinder provided by said compression column.

9. In a fluid actuator, a cylinder including a chamber for receiving a piston-rod assembly, said chamber having end wall members at opposite ends thereof, a liner member defining the inner wall of said chamber, said liner member being surrounded by circumferential hoop stress windings which prevent diametrical expansion of said liner member, and longitudinal tension windings extending over substantially the entire length of said cylinder, said cylinder including a support structure mount at one end, said longitudinal tension windings extending around said support structure mount intermediate the ends of said longitudinal tension windings, and securing means for securing the opposite ends of said longitudinal tension windings to said cylinder at the other end thereof.

10. The actuator of claim 9 wherein said support structure mount includes a pair of external flanges defining a semi-annular groove therebetween for receipt of said longitudinal tension windings.

11. The actuator of claim 10 wherein said longitudinal tension windings are substantially parallel to each other in the region of said support structure mount and then fan out from opposite sides of said cylinder at an angle toward the other end of said cylinder.

12. The actuator of claim 11 wherein said longitudinal tension windings substantially completely cover said other end of said cylinder.

13. The actuator of claim 9 wherein said securing means is attached to the other end wall member at the outboard end of said cylinder.

14. The actuator of claim 13 further comprising an end plate secured to the outer end of said other end wall member for preventing said other end wall member from being pulled into said chamber.

15. The actuator of claim 9 wherein said support structure mount is integrally formed with the adjacent end wall member.

16. The actuator of claim 9 further comprising a compression column between said support structure mount and one of said end wall members which provides an extension at the inboard end of said cylinder, said chamber containing a piston having a rod extending from one side of said piston through the other end wall member, and a tail stock extending from the opposite side of said piston through said one end wall member into the extension of said cylinder provided by said compression column.

17. The actuator of claim 16 wherein said longtudinal tension windings extend beyond both ends of said compression column.

18. The actuator of claim 16 wherein said support structure mount includes an annular groove in the axial inner end thereof for receipt of a hollow end on said tail stock when said piston is fully retracted.

19. The actuator of claim 9 wherein said liner member and end wall members are made of metal.

20. The actuator of claim 9 wherein said liner member is in sealed engagement with said end wall members.

21. In a fluid actuator, a cylinder including a chamber for receiving a piston-rod assembly, longitudinal tension windings extending around one end of said cylinder from one side to the other, securing means for securing the opposite ends of said longitudinal tension windings to said cylinder at the other end thereof, said cylinder including a support structure mount at said one end, said longitudinal tension windings extending around said support structure mount intermediate the ends of said longitudinal tension windings.

22. The actuator of claim 21 wherein said support structure mount includes a pair of external flanges defining a semi-annular groove therebetween for receipt of said longitudinal tension windings.

23. The actuator of claim 22 wherein said longitudinal tension windings are substantially parallel to each other in the region of said support structure mount and then fan out from opposite sides of said cylinder at an angle toward said other end of said cylinder.

24. The actuator of claim 21 wherein said chamber includes a pair of separate end wall members at opposite ends thereof, and said securing means comprises a ring retainer attached to the end wall member at the other end of said cylinder, said ring retainer including a circumferential groove in the outer surface thereof which receives the opposite ends of said longitudinal tensions windings, and means for affixing said longitudinal tension windings to said ring retainer.

25. The actuator of claim 21 wherein said chamber includes a pair of separate end wall members at opposite ends thereof, further comprising a compression column between said support structure mount and one of said end wall members which provides an extension at the inboard end of said cylinder, siad chamber containing a piston having a rod extending from one side of piston through the other end wall member, and a tail stock extending from the opposite side of said piston through said one end wall member into the extension of said cylinder provided by said compression column.

26. The actuator of claim 21 wherein said chamber includes a pair of separate end wall members at opposite ends thereof, the opposite ends of said tension windings being secured to the end wall member at said other end of said cylinder.

27. The actuator of claim 26 wherein said end wall members are made of metal.

28. In a fluid actuator, a cylinder including a chamber for receiving a piston-rod assembly, said chamber having end wall members at opposite ends thereof and a composite fiber wall structure, liner means providing a fluid barrier on the inner surface of said composite fiber wall structure, said composite fiber wall structure including circumferential hoop stress windings extending circumferentially around said chamber over the length thereof, said hoop stress windings and liner means axially overlapping the adjacent end of one of said end wall members, said one end wall member having a ring portion extending radially outwardly beyond said liner means and hoop stress windings, longitudinal tension windings extending axially beyond opposite ends of said chamber and over said ring portion, filler means for filling of voids between said hoop stress windings and longitudinal tension windings adjacent said ring portion, and securing means for securing said longitudinal tension windings to said ring portion.

29. The actuator of claim 28 wherein said filler means comprises additional circumferential hoop stress windings extending around the adjacent end of said one end wall member to fill the voids between said hoop stress windings and longitudinal tension windings adjacent said ring portion.

30. The actuator of claim 29 wherein said hoop stress windings and additional hoop stress windings extend substantially the full radial extent of said ring portion radially outwardly of the adjacent end of said one end wall member.

31. In a fluid actuator, a cylinder including a chamber for receiving a piston-rod assembly, said chamber having end wall members at opposite ends thereof and a composite fiber wall structure extending between said end wall members, said composite fiber wall structure including circumferential hoop stress windings extending substantially the full length of said chamber, said hoop stress windings overlapping one of said end wall members, said one end wall member having a ring portion extending radially outwardly therefrom beyond said circumferential hoop stress windings, longitudinal tension windings extending beyond the opposite ends of said chamber and over said ring portion, and filler means for filling of voids between said circumferential hoop stress windings and longitudinal tension windings adjacent said ring portion.

32. The actuator of claim 31 wherein said filler means includes additional hoop stress windings between said longitudinal tension windings and circumferential hoop stress windings adjacent said ring portion.

33. The actuator of claim 31 wherein said hoop stress windings overlap both of said end wall members.

* * * * *